K. W. BARTLETT.
STRAINER.
APPLICATION FILED OCT. 10, 1918.
1,326,385.
Patented Dec. 30, 1919.
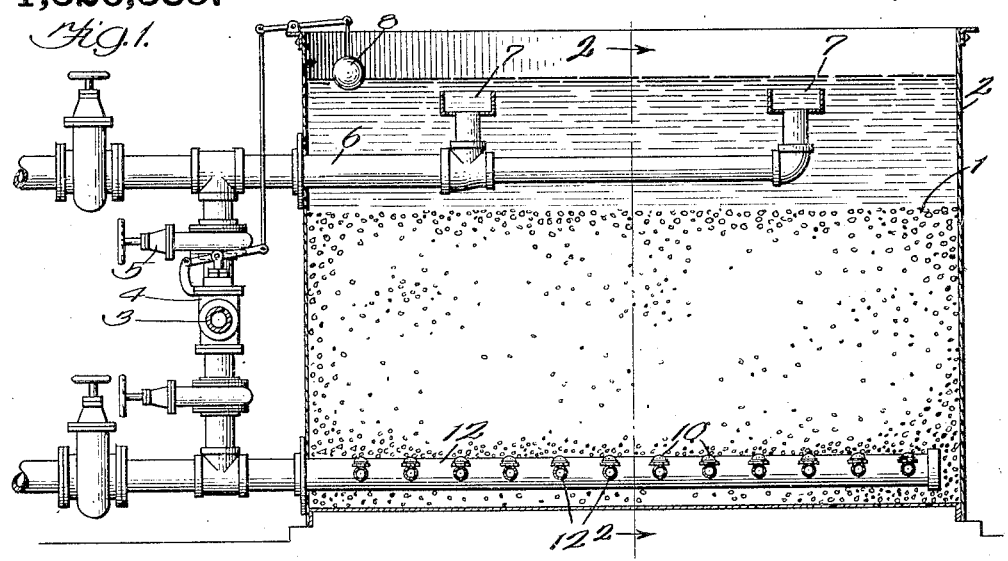
Fig. 1.
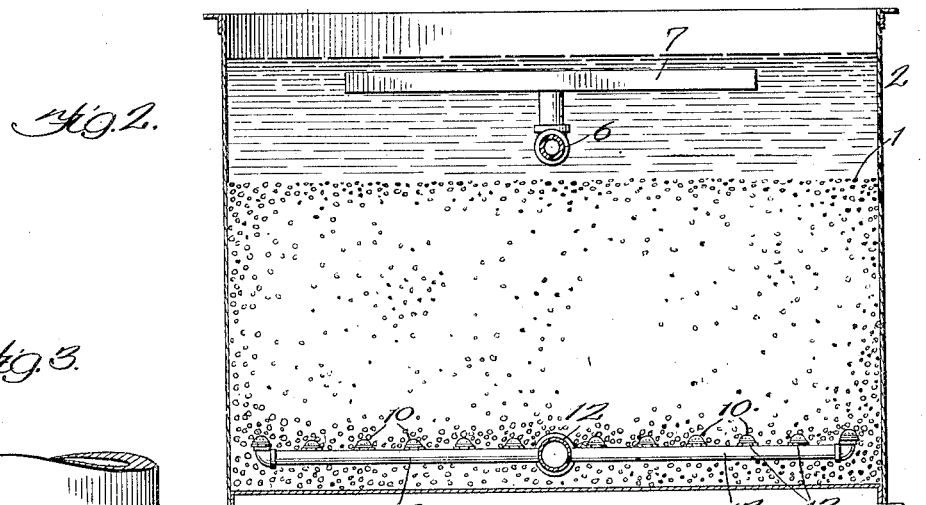
Fig. 2.
Fig. 3.
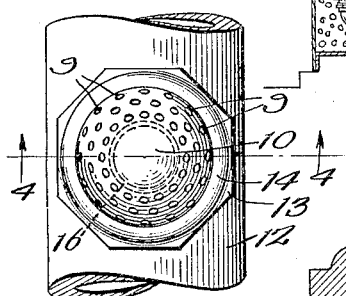
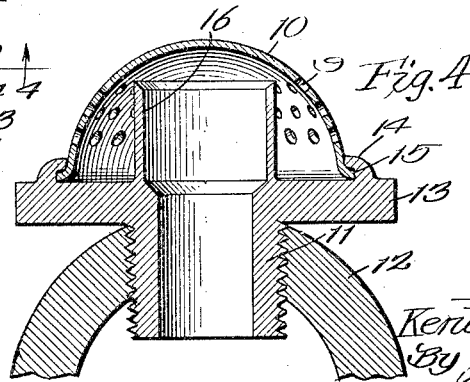
Fig. 4.
Inventor:
Kent W. Bartlett.

UNITED STATES PATENT OFFICE.

KENT W. BARTLETT, OF EAST CHICAGO, INDIANA.

STRAINER.

1,326,385.  Specification of Letters Patent.  Patented Dec. 30, 1919.

Application filed October 10, 1918. Serial No. 257,622.

*To all whom it may concern:*

Be it known that I, KENT W. BARTLETT, a citizen of the United States, residing at East Chicago, in the county of Lake and State of Indiana, have invented a certain new and useful Improvement in Strainers, of which the following is a full, clear, concise, and exact description.

My invention relates to filtering apparatus and particularly to the strainers that enter therein. The strainer upon which my invention is an improvement includes a nipple having a perforated cup-like top or dome. In such a device the nipple is usually provided with a flange that supports the cup in an inverted position and maintains the same in assembly with the nipple. Devices of this character have been assembled with water or other liquid eduction piping placed in a body of sand or quartz particles through which liquid that is to be filtered is passed to and through the strainers, the eduction piping conveying the filtered liquid from the strainers. These strainers prevent the filtering medium and other larger particles from passing into the eduction piping. Owing to the wearing contact of the filtering quartz or sand upon the strainer cups the holes therein become enlarged to permit of the passage of particles of filtering material. Furthermore these cups are liable to wear away near the bases thereof occasioning the breakage of the cups and the removal of the nipple covering portions thereof from their nipple guarding positions thereby permitting the nipples to be uncovered and allowing the passage of quartz therethrough to the eduction piping. The filtering sand or quartz that would pass through the worn cups with the filtered liquid would be apt to damage the valve mechanism that is employed to control the flow of the liquid and also the apparatus to which the liquid is furnished.

It is the object of my invention to prevent the passage of the filtering medium through the worn cups to and through the filtering nipples. In carrying out this invention I desirably extend the nipple beyond its flange into close proximity with the cup.

I will explain my invention more fully by reference to the accompanying drawing showing the preferred embodiment thereof and in which Figure 1 illustrates one form of filtering apparatus equipped with the strainer nipples of my invention; Fig. 2 is a sectional view on line 2—2 of Fig. 1; Fig. 3 is a plan view of the strainer of my invention; and Fig. 4 is a sectional view on line 4—4 of Fig. 3.

Like parts are indicated by similar characters of reference throughout the different figures.

The device of the invention is of service in connection with a variety of filtering equipment and is therefore not to be limited to its use in conjunction with the filtering equipment illustrated in Figs. 1 and 2.

In the structure shown the filtering sand and quartz or other filtering medium 1 is disposed in a tank or chamber 2. The water or other liquid to be filtered is admitted through the pipe 3 and passes by the valves 4 and 5 into the pipe 6 that extends into the filtering chamber 2. The water to be filtered enters the filtering chamber at the upper portion thereof and is evenly distributed over the filtering bed 1 by passing through the troughs 7 in its movement to the filtering bed. The valve 4 is an automatic valve controlled by the usual float mechanism 8 that prevents the water from exceeding an upper limiting level in the chamber 2. After the water has been discharged from the troughs 7 it finds its way downwardly through the filtering medium 1 and thence through the perforations 9 in the cups 10, preferably made of spun brass, that cover the nipples 11, preferably made of cast brass. These nipples are male threaded to enable them to be screwed into the eduction piping 12 at the top side thereof. The perforations 9 permit the filtered water to pass to the nipples but prevent the particles of sand, quartz or other filtering medium from passing to such nipples. The nipple is desirably formed with a flange 13 having a clenching rim 14 which overlies and is clenched into engagement with the outsetting rim 15 of the inverted cup 10, an arrangement that secures the strainer cup in desired guarding relation to the nipple covered thereby. The cups are apt to be worn through near the bases thereof, that is near the flanges 13, where the cups break apart to uncover the nipples and permit the filtering medium to pass into the eduction piping 12.

The weight of the filtering medium will serve to prevent the nipple covering portion of the cup from rising even when filter cleaning or flushing water is forced to flow upwardly through the chamber 2 from the eduction piping 12. Valve mechanism is illustrated for determining the normal flow of liquid through the filtering chamber for the purpose of filtering the same and for reversing the flow of such liquid for the washing operation and as such is so well understood by those skilled in the art a specific description thereof need not be given herein.

I provide each nipple with an extension 16 that projects within the corresponding cup. Clearance between top of guard 16 and the dome 10 is equal to or not appreciably greater than the diameter of the perforations 9 which are of the same size whereby particles that are normally prevented from passing through the perforations 9 cannot pass through said clearance in the event that said perforations become enlarged.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

A strainer including a nipple for attachment to piping; and a perforated cup assembled with and covering the nipple, said nipple having an extension projecting within the cup into close proximity thereto, there being clearance between the nipple and cup which approximates the diameters of the perforations in the cups whereby particles that are normally prevented from passing through the perforations cannot pass through said clearance in the event that said perforations become enlarged.

In witness whereof, I hereunto subscribe my name this 15th day of August A. D., 1918.

KENT W. BARTLETT.